US012646394B2

(12) United States Patent
Vartak

(10) Patent No.: US 12,646,394 B2
(45) Date of Patent: Jun. 2, 2026

(54) METHODS, APPARATUSES, AND SYSTEMS FOR INFRARED FIRE DETECTION

(71) Applicant: HONEYWELL INTERNATIONAL INC., Charlotte, NC (US)

(72) Inventor: Sameer Dinkar Vartak, Charlotte, NC (US)

(73) Assignee: Honeywell International Inc., Charlotte, NC (US)

( * ) Notice: Subject to any disclaimer, the term of this patent is extended or adjusted under 35 U.S.C. 154(b) by 180 days.

(21) Appl. No.: 18/459,972

(22) Filed: Sep. 1, 2023

(65) Prior Publication Data

US 2024/0096188 A1 Mar. 21, 2024

(30) Foreign Application Priority Data

Sep. 16, 2022 (IN) ............................ 202211053091

(51) Int. Cl.
*G08B 17/12* (2006.01)
*G08B 29/18* (2006.01)

(52) U.S. Cl.
CPC ......... *G08B 17/125* (2013.01); *G08B 29/185* (2013.01)

(58) Field of Classification Search
CPC ..... G08B 17/125; G08B 29/185; G08B 17/12
See application file for complete search history.

(56) References Cited

U.S. PATENT DOCUMENTS 4,160,163 A * 7/1979 Nakauchi ............... G08B 17/12 250/340
4,220,857 A * 9/1980 Bright .................... G08B 17/12 250/340
4,639,598 A * 1/1987 Kern ....................... F23N 5/082 250/340
4,691,196 A * 9/1987 Kern ....................... F23N 5/082 250/339.15
4,742,236 A * 5/1988 Kawakami ............. G08B 17/12 250/554

(Continued)

FOREIGN PATENT DOCUMENTS

JP 11-304582 A 11/1999
WO 2016/064994 A1 4/2016

OTHER PUBLICATIONS

Partial European Search Report Mailed on Feb. 9, 2024 for EP Application No. 23191402, 15 page(s).

(Continued)

*Primary Examiner* — Davetta W Goins
(74) *Attorney, Agent, or Firm* — Alston & Bird LLP

(57) ABSTRACT

Methods, apparatuses and systems for fire detection are disclosed herein. An example apparatus may comprise a first infrared camera comprising a first filter, a second infrared camera comprising a second filter. In some examples the apparatus comprises a controller electronically coupled to the first and second infrared cameras, the controller having processing circuitry and a memory, the controller may be configured to generate a first indicator signal using a first camera output signal corresponding to the first bandwidth and a second camera output signal corresponding to the second bandwidth, compare the first indicator signal with a first threshold, and generate a fire alarm signal using the comparison of the first indicator signal with the first threshold.

18 Claims, 8 Drawing Sheets

(56) References Cited

U.S. PATENT DOCUMENTS 5,850,182 A * 12/1998 Schuler .................. G08B 17/12 250/339.15
5,995,008 A * 11/1999 King ...................... G08B 17/12 250/339.15
6,150,659 A * 11/2000 Baliga ..................... G01J 5/026 250/342
6,255,651 B1 * 7/2001 Laluvein ................ G08B 17/12 340/578
6,373,393 B1 * 4/2002 Matsukuma ........... G08B 17/12 250/339.15
6,518,574 B1 * 2/2003 Castleman ............. G08B 29/24 250/339.05
6,853,452 B1 * 2/2005 Laufer ................. G01N 21/314 356/438
7,256,401 B2 * 8/2007 Garmer ..................... G01J 1/18 250/339.01
7,541,938 B1 * 6/2009 Engelhaupt ............ G08B 17/12 340/600
7,638,770 B2 * 12/2009 Serero ................ G01N 21/3504 250/339.05
7,714,290 B2 * 5/2010 Kudoh .................... G01J 5/602 250/339.05
8,227,756 B2 * 7/2012 Harchanko ............. F23N 5/082 250/339.15
8,547,238 B2 * 10/2013 Harchanko .......... G08B 29/188 340/447
9,413,989 B2 8/2016 Cole et al.
10,002,510 B2 * 6/2018 Ryder .................... G08B 17/00
10,345,152 B2 * 7/2019 Waldron .............. G08B 29/185
10,809,134 B2 * 10/2020 Bullock ................. G01K 13/00
2003/0102434 A1 * 6/2003 Nakauchi ................ G01J 5/602 250/339.15
2004/0052418 A1 * 3/2004 DeLean .................. G06F 21/32 382/209
2004/0089810 A1 * 5/2004 Brown .................... G01J 5/602 250/339.15
2005/0012626 A1 * 1/2005 Owrutsky ............ G08B 17/125 340/578
2005/0069207 A1 * 3/2005 Zakrzewski ........... G06V 20/52 382/218
2005/0195086 A1 * 9/2005 King ..................... G01J 5/0014 250/339.15
2008/0230701 A1 * 9/2008 Serero ................ G01N 21/3504 250/339.15
2013/0286213 A1 10/2013 Cetin et al.
2013/0335550 A1 * 12/2013 Rochenski ................ G06T 7/00 348/82
2014/0184793 A1 * 7/2014 Cole ...................... G06V 20/52 348/143
2015/0185139 A1 * 7/2015 Kiesel .................... G01N 21/77 356/402
2015/0204725 A1 * 7/2015 Huseynov ............ G01J 5/0018 250/338.3
2016/0307423 A1 * 10/2016 Ebner .................... G08B 17/12
2017/0108381 A1 * 4/2017 Waldron ............... G01J 5/0801
2017/0285366 A1 10/2017 Longbotham et al.
2019/0003984 A1 * 1/2019 Kester .................. G08B 21/182
2020/0141796 A1 * 5/2020 Ishikawa ............... G01J 5/0018
2020/0264149 A1 8/2020 Kester et al.
2021/0014396 A1 * 1/2021 Halstead ................ H04N 7/183
2021/0344851 A1 * 11/2021 Kester ................... G01J 3/0208
2021/0344852 A1 * 11/2021 Isberg ................... G01J 5/0205
2022/0008889 A1 * 1/2022 Jackson ................ A01M 21/04
2024/0096188 A1 * 3/2024 Vartak .................. G08B 29/185
2024/0406523 A1 * 12/2024 Rubin ....................... G01J 5/05

OTHER PUBLICATIONS

Extended European Search Report Mailed on Apr. 30, 2024 for EP Application No. 23191402, 14 page(s).
EP Office Action Mailed on Apr. 25, 2025 for EP Application No. 23191402, 7 page(s).

* cited by examiner

METHODS, APPARATUSES, AND SYSTEMS FOR INFRARED FIRE DETECTION

CROSS-REFERENCE TO RELATED APPLICATIONS

This application claims priority pursuant to 35 U.S.C. 119(a) to Indian Application No. 202211053091, filed Sep. 16, 2022, which application is incorporated herein by reference in its entirety.

BACKGROUND

Fire detection apparatuses may be used to detect presence of a fire in the environment where the detection apparatus is located. Example fire detection apparatuses may use infrared to detect fire. Many fire detection apparatuses, however, suffer from technical challenges and limitations or may be costly to manufacture. Through applied effort, ingenuity, and innovation, many of these identified problems have been solved by developing solutions that are included in embodiments of the present disclosure, many examples of which are described in detail herein.

BRIEF SUMMARY

Various embodiments described herein relate to methods, apparatuses, and systems for fire detection.

In accordance with various examples of the present disclosure, an apparatus is provided. The apparatus may comprise a first infrared camera comprising a first filter, a second infrared camera comprising a second filter. In some examples the apparatus comprises a controller electronically coupled to the first and second infrared cameras, the controller having processing circuitry and a memory, the controller may be configured to generate a first indicator signal using a first camera output signal corresponding to the first bandwidth and a second camera output signal corresponding to the second bandwidth, compare the first indicator signal with a first threshold, and generate a fire alarm signal using the comparison of the first indicator signal with the first threshold.

In some examples, the first infrared camera may be configured to receive an infrared radiation from an environment, and generate the first camera output signal in response to receiving the infrared radiation. In some examples the second infrared camera may be configured to receive the infrared radiation from the environment and generate the second camera output signal in response to receiving the infrared radiation.

In some examples, the first filter comprises a first bandpass filter having a first center wavelength and a first bandwidth and the second filter comprises a second bandpass filter having a second center wavelength and a second bandwidth.

In some examples, the first center wavelength is between about 7 microns and about 8 microns and the second center wavelength is between about 8 microns and about 14 microns.

In some examples, the first bandwidth and the second bandwidth do not overlap.

In some examples, the first camera output signal is a first infrared radiation intensity detected by the first camera in the first bandwidth, and the second camera output signal is a second infrared radiation intensity detected by the second camera in the second bandwidth.

In some examples, the controller is further configured to determine a difference between the first camera output signal and the second camera output signal, normalize the difference with a sum of the first camera output signal and the second camera output signal, and generate the first indicator signal using the normalized difference between the first and second camera output signals.

In some examples, the first threshold is determined to distinguish between when the infrared radiation is generated by water byproduct of fire versus when the infrared radiation is generated by a first category of one or more false alarm sources comprising any of arc welding, a heater, high temperature carbon dioxide gas, and/or IR reflecting material(s) and/or surface(s).

In some examples, the controller is further configured to determine a distance of an infrared radiation source from the fire detection apparatus, determine a second indicator signal using a sum of the first and second camera output signals, normalize the second indicator signal using the distance, compare the second indicator signal with a second threshold, and generate the fire alarm using the comparison of the first indicator signal with the first threshold and the comparison of the second indicator signal with the second threshold.

In some examples, the second threshold is determined to distinguish between when the infrared radiation is generated by water byproduct of fire versus when the infrared radiation is generated by a second category of one or more false alarm sources comprising hot steam.

In accordance with various examples of the present disclosure, a method for fire detection is provided. The method may comprise determining a first wavelength response, determining a second wavelength response, generating a first indicator signal using a first camera output signal corresponding to the first bandwidth and a second camera output signal corresponding to the second bandwidth, comparing the first indicator signal with a first threshold, and generating a fire alarm signal using the comparison of the first indicator signal with the first threshold.

In some examples, the method may comprise receiving an infrared radiation from an environment, generating the first camera output signal in response to receiving the infrared radiation, and generating the second camera output signal in response to receiving the infrared radiation.

In some examples the first wavelength response comprises a first center wavelength and a first bandwidth and the second wavelength response comprises a second center wavelength and a second bandwidth.

In some examples, the first center wavelength is between about 7 microns and about 8 microns and the second center wavelength is between about 8 microns and about 14 microns.

In some examples, the first bandwidth and the second bandwidth do not overlap.

In some examples, the first camera output signal is a first infrared radiation intensity detected by a first camera in the first bandwidth, and the second camera output signal is a second infrared radiation intensity detected by a second camera in the second bandwidth.

In some examples, the method may further comprise determining a difference between the first camera output signal and the second camera output signal, normalizing the difference with a sum of the first camera output signal and the second camera output signal, and generating the first indicator signal using the normalized difference between the first and second camera output signals.

In some examples, the method may further comprise determining the first threshold to distinguish between when the infrared radiation is generated by water byproduct of fire versus when the infrared radiation is generated by a first category of one or more false alarm sources comprising any of arc welding, a heater, high temperature carbon dioxide gas, and/or IR reflecting material(s) and/or surface(s).

In some examples, the method may further comprise determining a distance of an infrared radiation source, determining a second indicator signal using a sum of the first and second camera output signals, normalizing the second indicator signal using the distance, comparing the second indicator signal with a second threshold, and generating the fire alarm using the comparison of the first indicator signal with the first threshold and the comparison of the second indicator signal with the second threshold.

In some examples, the method may further comprise determining the second threshold to distinguish between when the infrared radiation is generated by water byproduct of fire versus when the infrared radiation is generated by a second category of one or more false alarm sources comprising hot steam.

The foregoing illustrative summary, as well as other exemplary objectives and/or advantages of the disclosure, and the manner in which the same are accomplished, are further explained in the following detailed description and its accompanying drawings.

BRIEF DESCRIPTION OF THE DRAWINGS

The description of the illustrative embodiments may be read in conjunction with the accompanying figures. It will be appreciated that, for simplicity and clarity of illustration, elements illustrated in the figures have not necessarily been drawn to scale, unless described otherwise. For example, the dimensions of some of the elements may be exaggerated relative to other elements, unless described otherwise. Embodiments incorporating teachings of the present disclosure are shown and described with respect to the figures presented herein, in which.

DETAILED DESCRIPTION OF THE INVENTION

Figure 1:
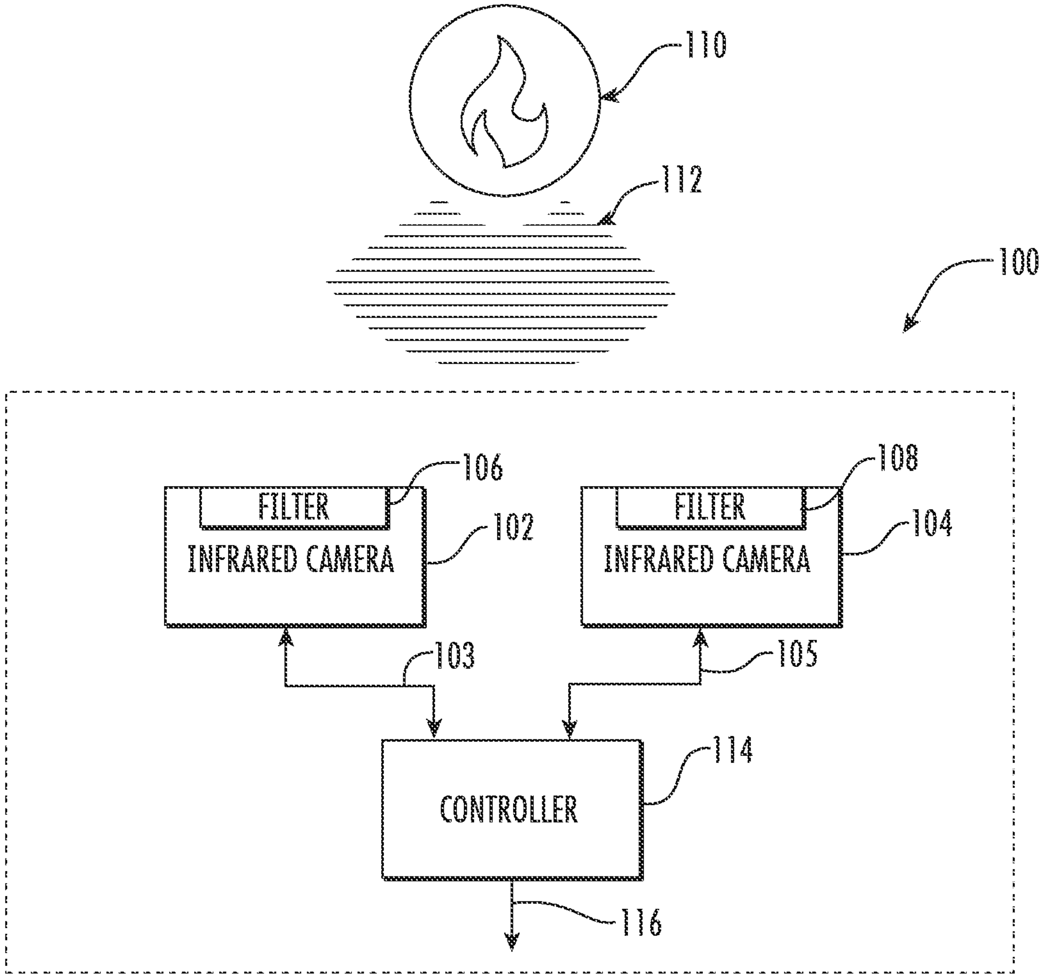
FIG. 1 illustrates an example schematic diagram depicting a fire detection apparatus in accordance with various embodiments of the present disclosure.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

The components illustrated in the figures represent components that may or may not be present in various embodiments of the present disclosure described herein such that embodiments may include fewer or more components than those shown in the figures while not departing from the scope of the present disclosure. Some components may be omitted from one or more figures or shown in dashed line for visibility of the underlying components.

The phrases "in an example embodiment," "some embodiments," "various embodiments," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such components or features may be optionally included in some embodiments, or may be excluded.

The terms "electronically coupled" or "in electronic communication with" in the present disclosure refer to two or more electrical elements (for example, but not limited to, a controller, infrared camera, filter, an example processing circuitry, communication module, input/output module, memory) and/or electric circuit(s) being connected through wired means (for example but not limited to, conductive wires or traces) and/or wireless means (for example but not limited to, wireless network, electromagnetic field), such that data and/or information (for example, electronic indications, signals) may be transmitted to and/or received from the electrical elements and/or electric circuit(s) that are electronically coupled.

The term "electromagnetic radiation" or "radiation" may refer to various kinds of electromagnetic radiant energy that exhibits properties of waves and particles including visible light, radio waves, microwaves, infrared (IR), ultraviolet (UV), X-rays and gamma rays. Visible light may refer to electromagnetic radiation that can be detected by a human eye. The electromagnetic spectrum comprises a range of all known types of electromagnetic radiation, including electromagnetic radiation that cannot be detected by the human eye. Various portions of the electromagnetic spectrum are associated with electromagnetic radiation that has certain characteristics (e.g., certain wavelengths and frequencies). For example, visible light emits electromagnetic radiation with wavelengths ranging between 380 and 750 nanometers (nm). In contrast, IR electromagnetic radiation may comprise wavelengths ranging between 0.7 and 14 microns.

In various embodiments herein as used in present disclosure, the term "fire" may also refer to combustion, smoldering, burning, excessive heat, and/or flame associated with or related to a state, process, or instance of combustion in which fuel or other material is ignited and combined with oxygen, giving off light, heat, and/or flame.

In some examples, fire produces electromagnetic radiation with certain characteristics. For example, fire may emit electromagnetic radiation with particular visible and/or infrared light characteristics/properties (e.g., wavelengths, intensity, image shape, and/or the like). These characteristics and properties may depend on characteristics of a fire source (e.g., fuel type). The visible light radiation produced by a fire may be detected using visible wavelength camera(s), and/or the infrared radiation may be detected using infrared camera(s).

Various example embodiments of the present disclosure provide a fire detection apparatus that may be configured to monitor a field of view and generate alerts or alarms and/or activate a fire suppression system based on detected environmental conditions. An example fire detection apparatus may be configured to detect radiation (e.g., electromagnetic radiation such as infrared radiation) within an environment. In some embodiments, fire detection apparatuses may be required and/or installed in environments where there is a high likelihood of a fire and/or where certain types of combustible materials are used or stored. For example, fire detection apparatuses may be required at power plants, chemical storage and production facilities, factories, etc. In some embodiments, fire detection apparatuses may be required and/or installed in residential, commercial, recreational and/or other facilities. In various embodiments fire detection apparatuses may be used in any environment where fire may cause harm to life, health, and/or property.

A byproduct of fire is carbon dioxide ($CO_2$). In some examples, a fire detection apparatus may be configured to detect infrared radiation peak that may be produced by the carbon dioxide byproduct of fire at wavelengths about 2 to 6 micron, more preferably 3.5 to 5 micron, and most preferably about 4.3 micron. Detecting a peak infrared radiation at the wavelengths of about 4.3 micron requires, in some examples, an infrared camera with a broadband filter, which may be costly. It is desirable, in some examples, to reduce the cost of fire detection apparatuses that use infrared camera(s).

A fire detection apparatus may use a single pixel infrared detector to detect fire. In some instances, for a single pixel fire detector to distinguish fire from false alarm, the detector may need to be trained for many or all possible sources of false alarm. This may increase cost and complexity. In some instances, single pixel detectors detect a sum of signals related to fire and a false alarm. It may therefore be difficult to separate the signals related to fire and false alarm as detected by a single pixel detector and/or an algorithm for providing the separation may have high complexity and may be prone to error.

As presented in various embodiments of the present disclosure, water ($H_2O$) is also a byproduct of fire. In various embodiments herein, a fire detection apparatus may be configured to detect an infrared radiation emitted by the water byproduct of a fire to detect the fire. The infrared radiation emitted by the water byproduct of fire has a unique pattern/signature in the wavelength range of about 7 microns to about 8 microns. In various embodiments herein, a fire detection apparatus may use long wavelength infrared (LWIR) camera(s) that use bandpass filters with passband between about 7 microns to about 14 microns. According to various embodiments herein and in some examples, using LWIR camera(s) may reduce the cost of the fire detection apparatuses.

In various embodiments a fire detection apparatus is provided that includes a first infrared camera and a second infrared camera. The first infrared camera may be configured to receive an infrared radiation from the environment where the fire detection apparatus is located. The first infrared camera may generate a first camera output signal. The second infrared camera may be configured to receive the infrared radiation from the environment and generate a second camera output signal.

In various embodiments, the fire detection apparatus may further include a controller electronically coupled to the first and second infrared cameras. The controller may be configured to generate a first indicator signal using the first and second camera output signals.

In various embodiments, to determine the first indicator signal, the controller may be configured to determine a difference between the first camera output signal and the second camera output signal. The controller may be configured to normalize the difference with a sum of the first camera output signal and the second camera output signal and generate the first indicator signal using the normalized difference between the first and second camera output signals.

The controller may compare the first indicator signal with a first threshold and generate a fire alarm signal using the comparison of the first indicator signal with the first threshold. In various embodiments, the first threshold may be determined to distinguish between when the infrared radiation is generated by water byproduct of the fire versus when the infrared radiation is generated by a first category of false alarm sources. The first category of false alarm sources may include any of arc welding, a heater, high temperature carbon dioxide gas, and/or IR reflecting material(s) and/or surface(s).

In various embodiments, the first infrared camera may include a first bandpass filter. The first bandpass filter may have and/or may be characterized by a first center wavelength and a first bandwidth. The second infrared camera may include a second bandpass filter. The second bandpass filter may have and/or may be characterized by a second center wavelength and a second bandwidth.

In various embodiments the first center wavelength of the first bandpass filter may be between about 7 microns and about 8 microns. In various embodiments, the first bandwidth of the first bandpass filter may be selected such that the first camera receives all and/or some of the unique signature/pattern of the infrared radiation from the water byproduct of fire. For example, when the unique signature/pattern of the infrared radiation is in the wavelength range of between about 7 microns to about 8 microns, the first bandpass filter may have a bandwidth of about 1 micron covering approximately all the wavelength range of between about 7 microns to about 8 microns. In some example embodiments, the first bandpass filter may have a bandwidth between about zero to bout one micron covering some of the unique signature/pattern of the infrared radiation. For example, the first bandpass filter may have a bandwidth between about 0.1 micron to about 0.9 micron with a center frequency between about 7.1 micron to 7.9 micron, hence the first camera may receive some of the unique signature/pattern pf the infrared radiation. In an example, the first bandpass filter may have a bandwidth between about 0.1 micron to about 0.5 micron with a center frequency between about 7.2 micron to 7.6 micron. In an example, the first bandpass filter may have a bandwidth of about 0.148 with a center frequency of about 7.4 micron.

In various embodiments the second center wavelength may be between about 8 microns and about 14 microns. In various embodiments herein, the second bandwidth of the second bandpass camera is selected not to overlap with the first bandwidth of the first bandpass filter. In various embodiment, the second center wavelength and the second bandwidth may be selected to provide for detection of the unique signature/pattern signature of water byproduct of fire, when the first camera output is compared with the second camera output.

In various embodiments, the first camera output signal may be a first infrared radiation intensity detected by the first camera over the first bandwidth. In various embodiments, the second camera output signal may be a second infrared radiation intensity detected by the second camera over the second bandwidth.

In various embodiments, the controller may further be configured to determine a distance of an infrared radiation source from the fire detection apparatus. The controller may be configured to determine a second indicator signal by determining a sum of the first and second camera output signals and normalizing the second indicator signal using the distance.

In various embodiments, the controller may compare the second indicator signal with a second threshold and generate the fire alarm using the comparison of the first indicator signal with the first threshold and the comparison of the second indicator signal with the second threshold.

In various embodiments, the second threshold may be determined to distinguish between when the infrared radiation is generated by water byproduct of the fire versus when the infrared radiation is generated by a second category of false alarm sources including hot steam.

In example embodiments, the distance of the infrared radiation source from the fire detection apparatus may be determined using a phase difference of the infrared radiation when received by the first infrared camera compared to when received by the second infrared camera. In example embodiments the distance is determine using triangulation. In example embodiment, a Time of Flight (ToF) distance measuring device may be used to determine the distance. In example embodiments a separation between the first infrared camera and the second infrared camera may be used to identify parallax versus distance for the infrared radiation source and to determine distance.

Referring now to FIG. 1, an example schematic diagram depicts an example fire detection apparatus 100 in accordance with various embodiments of the present disclosure. The fire detection apparatus 100 may include a first infrared camera 102 and a second infrared camera 104. The first and second infrared cameras 102 and 104 may include one or more pixel(s) or pixel array(s) sensitive to infrared radiation. In an example, each pixel may create a voltage and/or current in response to incident infrared radiation.

In various embodiments, the first infrared camera 102 may be configured to receive or otherwise detect an infrared radiation 112 from the environment in which the fire detection apparatus 100 is located. In some embodiments herein, the infrared radiation 112 maybe originated from an infrared radiation source 110. In an example, the infrared radiation source 110 may be fire source(s). In an example, the infrared radiation source 110 may be source(s) other than fire. For example, when the infrared radiation 112 is originated from source(s) other than fire, it may be originated from false alarm source(s).

In various embodiments, in response to receiving the infrared radiation 112, the first infrared camera 102 may generate a first camera output signal 103.

In various embodiments, the second infrared camera 104 may be configured to receive or otherwise detect the infrared radiation 112 from the environment in which the fire detection apparatus 100 is located. In response to receiving the infrared radiation 112, the second infrared camera 104 may generate a second camera output signal 105.

In various embodiments, the fire detection apparatus 100 may include a controller 114 electronically coupled to the first and second infrared cameras 102 and 104. The controller 114 may be configured to generate a first indicator signal using the first and second camera output signals 103 and 105.

In various embodiment, the controller 114 may generate the first indicator signal by first determining a difference between the first camera output signal 103 and the second camera output signal 105. The controller 114 may normalize the difference with a sum of the first camera output signal 103 and the second camera output signal 105. The controller 114 may generate the first indicator signal using the normalized difference between the first and second camera output signals. In various embodiments, the controller 114 normalizes the difference by dividing it with the sum of the first camera output signal 103 and the second camera output signal 105.

In various embodiments, the controller 114 determines the first indicator signal according to following equation (Eq. 1):

$$\text{first } idicator \text{ signal} = \frac{\text{first camera output} - \text{second camera output}}{\text{first camera output} + \text{second camera output}} \quad \text{Eq. 1}$$

In various embodiments, the controller 114 removes a compounding attenuation effect due to the distance of the infrared radiation source 110 by normalizing the difference between the first camera output signal 103 and the second camera output signal 105, for example according to Eq. 1.

In various embodiments herein, the controller 114 may compare the first indicator signal with a first threshold. In various embodiments, the controller 114 may generate a fire alarm signal 116 using the comparison of the first indicator signal with the first threshold. For example, if the first indicator signal is greater than the first threshold, the controller 114 may generate the fire alarm signal 116.

In various embodiments, the first infrared camera 102 may include a first filter 106 having a first wavelength response. In example embodiments, the first filter 106 is a low pass filter. For example, the low pass filter may have a cut off wavelength in about 7.5-8.5 micron range. For example, the low pass filter may have a cut off wavelength in about 7.8-8.2 micron range. For example, the low pass filter may have a cut off wavelength in about 7.9-8.1 micron range. For example, the low pass filter may have a cut off wavelength of about 8 microns.

In example embodiments, the second infrared camera 104 may include a second filter 108. In example embodiments, the second filter 108 is a high pass filter. For example, the high pass filter may have a cut off wavelength in about 8.5-14 micron range. For example, the high pass filter may have a cut off wavelength in about 9-12 micron range. For example, the high pass filter may have a cut off wavelength in about 9-10 micron range. For example, the high pass filter may have a cut off wavelength in about 9.5-9.8 micron range. For example, the high pass filter may have a cut off wavelength of about 9.6 microns.

In various embodiments, the first infrared camera 102 generates the first camera output signal 103 corresponding to the first filter 106. In various embodiments, the second infrared camera 104 generates the second camera output signal 105 corresponding to the second filter 108.

In example embodiments, the first filter 106 is a first bandpass filter having a first center wavelength and a first bandwidth. In example embodiments, the second filter 108 is a second bandpass filter having a second center wavelength and a second bandwidth.

In various embodiments, the first camera output 103 corresponds to the first bandwidth. For example, in response to filtering the infrared radiation 112 using the first bandpass filter for the filter 106 having the first bandwidth, the first infrared camera 102 generates the first camera output signal 103. In an example, the first camera output signal 103 corresponds to the filtered portion of the infrared radiation 112 in the first bandwidth.

In various embodiments, the second camera output 105 corresponds to the second bandwidth. For example, in response to filtering the infrared radiation 112 using the second bandpass filter 108 for the second filer 108 having the second bandwidth, the second infrared camera 104 generates the second camera output signal 105. In an example, the second camera output signal 105 corresponds to the filtered portion of the infrared radiation 112 in the second bandwidth.

While FIG. 1 provides an example of a fire detection apparatus 100 that includes infrared cameras, it is noted that the scope of the present disclosure is not limited to the example shown in FIG. 1. In some examples, an example fire detection apparatus 100 may include any number of infrared cameras. In some examples, the fire detection apparatus 100 may include one or more additional and/or alternative elements, and/or may be structured/positioned differently than that illustrated in FIG. 1. For example, the fire detection apparatus 100 may include one or more visible wavelength camera(s) that may receive and/or detect visible wavelength emitted by the source 110. The one or more visible wavelength camera(s) may be couples to the controller 114 and/or to the infrared cameras 102, 104.

Figure 2:
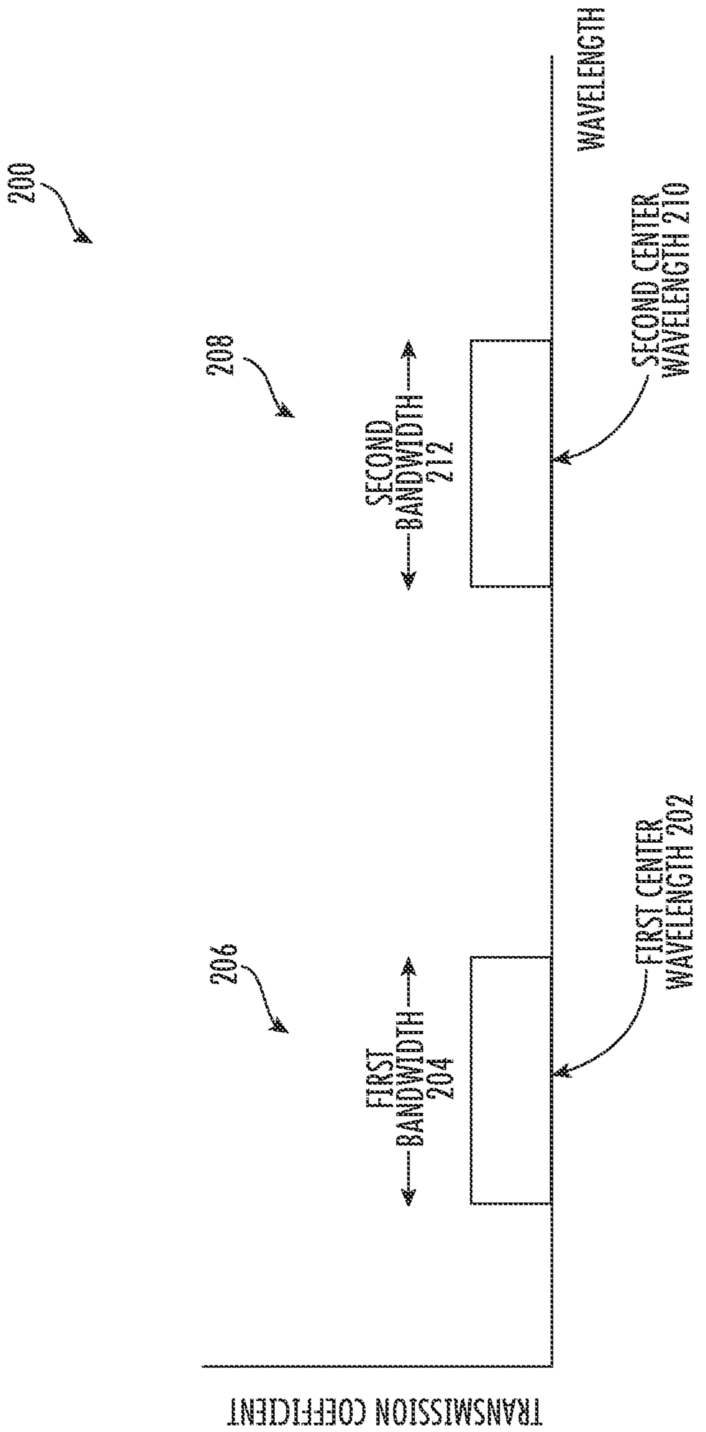
FIG. 2 illustrates an example diagram depicting wavelength response in accordance with various embodiments of the present disclosure.

Referring now to FIG. 2, an example diagram 200 depicts wavelength response for the example embodiments using first and second bandpass filters for the first and second filters 106 and 108 in accordance with various embodiments of the present disclosure. For example, FIG. 2 depicts a transmission coefficient to illustrate the wavelength response for the example embodiments using first and second bandpass filters for the first and second filters 106 and 108. In an example, the transmission coefficient is a percentage and/or ratio of an output with respect to the input of a filter. It is noted that the schematic diagram 200 is for illustration purposes and is not an accurate recreation of bandpass filter wavelength response(s) and/or transmission coefficient(s).

In various embodiments, the first bandpass filter used for the first filter 106 may have a first wavelength response 206 including a first center wavelength 202 and a first bandwidth 204 as for example shown in the schematic diagram 200. In various embodiments, the second bandpass filter used for the second filter 108 may have a second wavelength response 208 including a second center wavelength 210 and a second bandwidth 212 as for example shown in the schematic diagram 200.

In various embodiments, the first center wavelength 202 may be between about 7 microns and about 8 microns. In an example embodiment, the first center wavelength 202 is between about 7.2 microns and about 7.8 microns. In an example embodiment, the first center wavelength 202 is between about 7.3 microns and about 7.7 microns. In an example embodiment, the first center wavelength 202 is between about 7.35 microns and about 7.55 microns. In an example embodiment, the first center wavelength 202 is between about 7.37 microns and about 7.45 microns. In an example embodiment, the first center wavelength 202 may be about 7.4 micron.

In an example embodiment, the second center wavelength 210 may be between about 8 microns and about 14 microns. In an example embodiment, the second center wavelength 210 may be between about 8.5 microns and about 13 microns. In an example embodiment, the second center wavelength 210 may be between about 9 microns and about 11 microns. In an example embodiment, the second center wavelength 210 may be between about 9.5 microns and about 10.5 microns. In an example embodiment, the second center wavelength 210 may be about 9.815 micron.

In various embodiments herein, the first bandwidth 204 and the second bandwidth 212 do not overlap. In an example embodiment, the first bandwidth 204 is between about 0.05 micron to about 0.95 micron. In an example embodiment, the first bandwidth 204 is between about 0.1 micron to about 0.8 micron. In an example embodiment, the first bandwidth 204 is between about 0.1 micron to about 0.7 micron. In an example embodiment, the first bandwidth 204 is between about 0.12 micron to about 0.4 micron. In an example embodiment, the first bandwidth 204 is between about 0.13 micron to about 0.2 micron. In an example embodiment, the first bandwidth 204 is about 0.148 micron.

In an example embodiment, the second bandwidth 212 is between about 0.1 micron to about 4 micron. In an example embodiment, the second bandwidth 212 is between about 0.15 micron to about 2 micron. In an example embodiment, the second bandwidth 212 is between about 0.2 micron to about 1 micron. In an example embodiment, the second bandwidth 212 is between about 0.21 micron to about 0.5 micron. In an example embodiment, the second bandwidth 212 is about 0.220 micron.

In various embodiments, referring to FIG. 1, the first camera output signal 103 may be an infrared radiation intensity detected by the first camera 102 over the first bandwidth 204. In various embodiments, the second camera output signal 105 may be an infrared radiation intensity detected by the second camera 104 over the second bandwidth 212.

Figure 3:
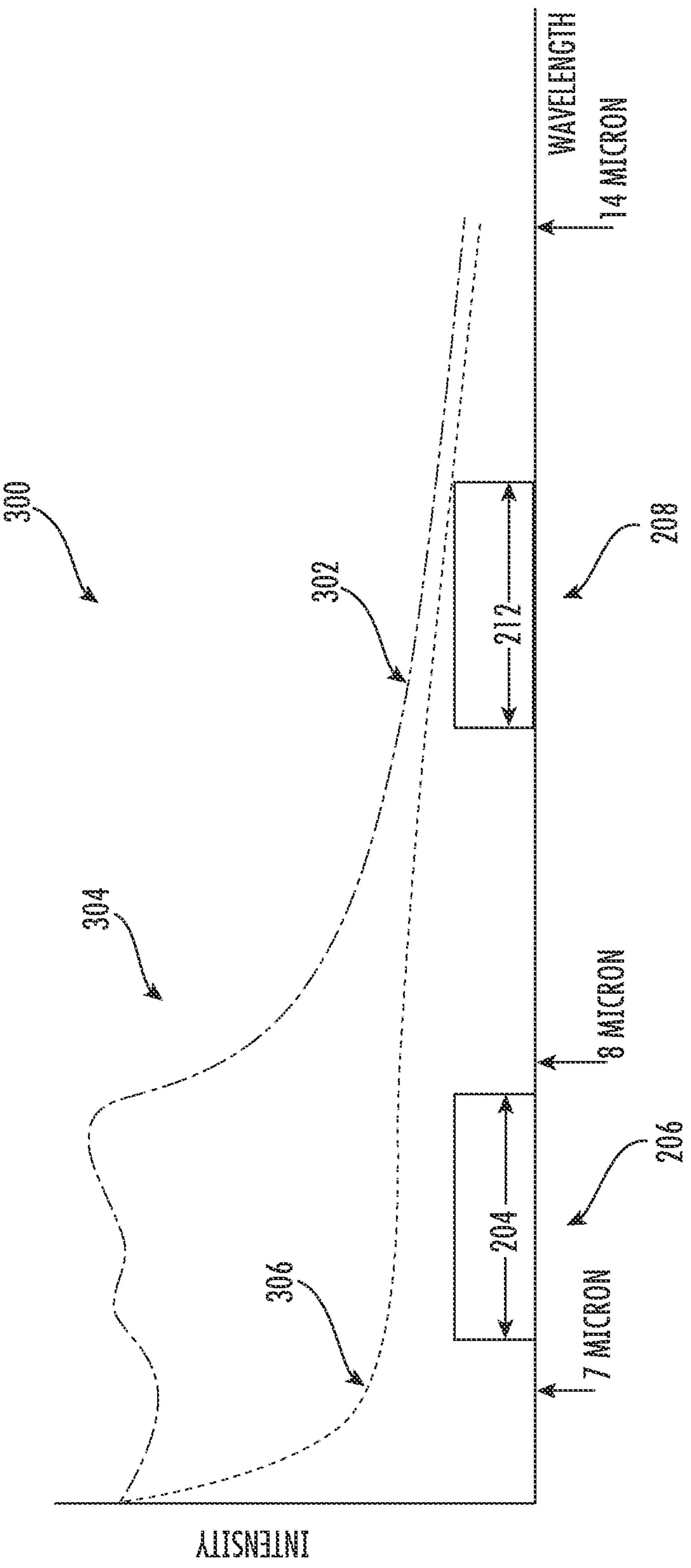
FIG. 3 illustrates an example diagram depicting intensity spectrum in accordance with various embodiments of the present disclosure.

Referring now to FIG. 3, a diagram 300 depicting an example intensity spectrum of infrared radiation versus wavelength in accordance with various embodiments of the present disclosure is provided.

In various embodiments, intensity spectrum graph 302 is an example illustration of infrared intensity generated by a fire. As referred to in various embodiments herein, fire generates byproducts including carbon dioxide ($CO_2$), water ($H_2O$), and carbon particles (soot). As referred to in various embodiments of the present disclosure, due to the presence of water byproduct in fire, there may be a distinguishing feature and/or signature in the intensity spectrum of fire in the wavelength range between about 7 microns to 8 microns. This unique feature and/or signature may be caused by infrared absorption and/or emission of the water byproduct in fire.

In various embodiments, as for example shown by intensity spectrum graph 302, the unique feature/signature due to the water byproduct in fire may include a steep bend 304 in the intensity spectrum at wavelengths of about 8 micron and/or a higher intensity in the wavelength range of about 7 microns to about 8 microns as compared to the rest of the intensity spectrum graph 302. According to various embodiments, when comparing the intensity spectrum of fire with an intensity spectrum of various false alarm sources, such as arc welding, a heater for example an infra heater, high temperature carbon dioxide gas, IR reflecting material(s) and/or surface(s), etc., the distinguishing feature/signature may differentiate infrared radiation generated by fire from infrared radiation generated by various sources of false alarm.

In an exemplary embodiment, intensity spectrum graph 306 is a generic an/or approximate depiction of the intensity spectrum of various sources of false alarm. The intensity spectrum of infrared radiation generated by various sources of false alarm may not have the distinguishing feature/signature of the intensity spectrum of infrared radiation generated by fire in the wavelength range between about 7 microns to 8 microns. For example, as shown in FIG. 3, graph 306 may not have the steep bend similar to that of intensity spectrum graph 304 at wavelengths of about 8 micron and/or may not have the higher intensity in the wavelength range of about 7 microns to about 8 microns as compared with the rest of the intensity spectrum graph 306.

In various embodiments, by detecting the distinguishing feature/signature of the intensity spectrum of infrared radiation in the wavelength range between about 7 microns to 8 microns, it is determined that the infrared radiation is generated by fire, therefore a presence of fire is detected. In various embodiments herein, referring to FIG. 1, the infrared cameras 102 and 104 receive the infrared radiation 112 and generate the first and second camera outputs 103 and 105. In various embodiments, using the first and second camera outputs 103 and 105, the controller 112 determines whether the distinguishing feature/signature of the intensity spectrum that indicates fire as the infrared radiation source 110 is present.

For illustration and/or comparison purposes, in accordance with example embodiments herein, the wavelength response 206 of the first passband filter used for the filter 106 and the wavelength response 208 of the second passband filter used for the second filter 108 are depicted in FIG. 3. In various embodiments, when using the first and second infrared cameras 102, 104 using first and second bandpass filters as the first and second filters 106, 108 to detect the infrared radiation 112, a difference between the first and second camera output signals 103 and 105 may be determined. In various embodiments, since the graph 302 has a higher intensity in the about 7 to about 8 microns range and/or the steep bend 304, the difference between the first and second camera output signals 103 and 105 may be higher for intensity spectrum graph 302 than it would be for the intensity spectrum graph 306. This difference may be a sign of the distinguishing feature/signature of the intensity spectrum that is an indication of fire as the infrared radiation source 110.

A distance of the infrared radiation source 110 from the fire detection apparatus 100 may have a compounding attenuation effect on the intensity of the infrared radiation 112 when received by the first and second cameras 102 and 104. For example, a closer source may cause higher intensity of the infrared radiation 112 to be received by the first and second cameras 102 and 104 resulting in higher first and second camera outputs 103 and 105. The compounding attenuation effect of distance on the intensity of the infrared radiation 112 may impact the determination of the presence of the distinguishing feature/signature of the intensity spectrum.

In various embodiments herein, the compounding attenuation effect of distance of the source is removed by normalizing the difference between the first camera output signal 103 and the second camera output signal 105. In various embodiments, the controller 114 normalizes the difference by dividing it with the sum of the first camera output signal 103 and the second camera output signal 105 and to determine the first indicator signal as shown in Eq. 1.

In various embodiments, a higher indicator signal indicates a larger difference in the intensity between the first bandwidth 204 and the second bandwidth 212 of the intensity spectrum of the infrared radiation 112. In various embodiments, the compounding attenuation effect of distance is reduced/and or removed in the first indicator signal.

In various embodiments, the controller 114 determines and compares the first indicator signal with the first threshold. In various embodiments, when the first indicator signal is greater than the first threshold, the controller 114 determines that the source of the infrared radiation 112 may be fire.

In various embodiments, the first threshold may be determined to distinguish between when the infrared radiation is generated by water byproduct of the fire versus when the infrared radiation is generated by a first category of false alarm sources comprising any of arc welding, a heater for example an IR heater, high temperature carbon dioxide gas, and/or IR reflecting material(s) and/or surface(s), etc.

Figure 4A:
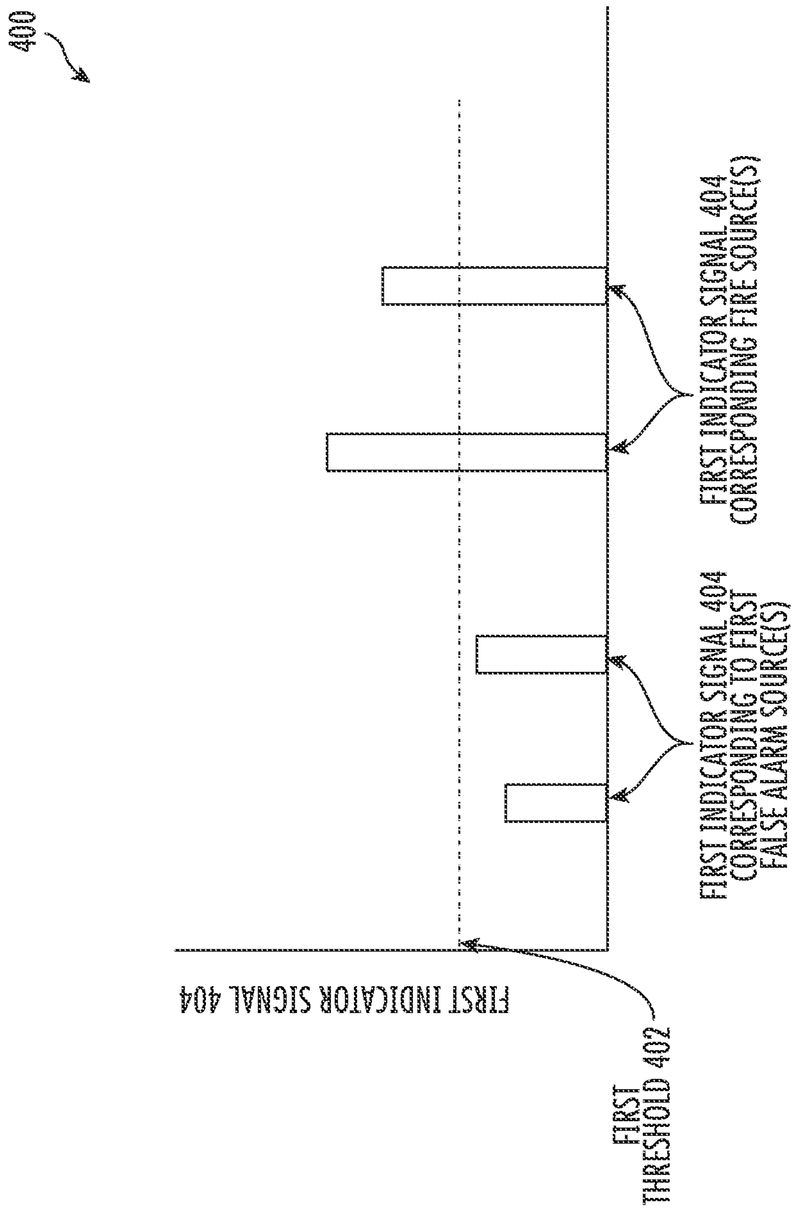
FIG. 4A illustrates an example diagram for determining a threshold in accordance with various embodiments of the present disclosure.

Referring now to FIG. 4A, a diagram 400 for determining the first threshold 402 in accordance with various embodiments of the present disclosure is provided. In various embodiments, the controller 114 may determine the first indicator signal 404 for various first false alarm source(s) and/or various fire source(s) generating the infrared radiation 112. According to various embodiments, the first false alarm source(s) may include arc welding, a heater for example an IR heater, high temperature carbon dioxide gas, and/or IR reflecting material(s) and/or surface(s). According to various embodiments, the first false alarm source(s) may exclude hot steam. According to various embodiments, the fire source(s) may include various fire producing fuels such as hydrogen, heptane, n-heptane, Jet Propellant 8 (JP8), methanol, ethanol, diesel, gasoline, isopropyl alcohol (IPA), etc. In various embodiments herein the first threshold 402 is selected so that it is greater than the first indicator signal 404 corresponding to any of the first false alarm source(s) and is less than the first indicator signal 404 corresponding to any of the fire source(s). In various embodiments herein, the controller 114 determines the first threshold 402.

In various embodiments, the first indicator signal 404 corresponding to various first false alarm source(s) may be below the first indicator signal 404 corresponding to the fire source(s). In various embodiments, the first indicator signal 404 corresponding to hot steam, which may be excluded from the first false alarm source(s), may not be below the first indicator signal 404 corresponding to the fire source(s). In various embodiments herein, a second indicator signal and a second threshold may be used to distinguish a various second false alarm source(s) of including hot steam, from the fire source(s).

Now referring now to FIG. 4A, in various embodiments, to distinguish the fire source(s) from the second false alarm source(s) including hot steam, the controller 114 may determine a second indicator signal 454 using a sum of the first and second camera output signals 103 and 105 (with reference to FIG. 1).

In various embodiments, a compounding attenuation effect of the distance of the source 110 from the fire detection apparatus 100 may be mitigated. In various embodiments, to mitigate the compounding attenuation effect of distance, the controller 114 determines the distance of the source 110 of the infrared radiation 112 from the fire detection apparatus 100. In example embodiments, the distance may be detected using a phase difference of the infrared radiation 112 when received by the first camera 102 compared to when received by the second infrared camera 104. In example embodiments, the distance may be determined using triangulation. In example embodiment, a Time of Flight (ToF) distance measuring device may be used to determine the distance. In example embodiments a separation between the first infrared camera 102 and the second infrared camera 104 may be used to identify parallax versus distance for the infrared radiation source 110 and to determine distance.

In various embodiments, the controller 114 may determine the second indicator signal 454 by normalizing the sum of the first and second camera output signals 103 and 105 using the distance to remove the compounding attenuation effect due to distance.

Figure 4B:
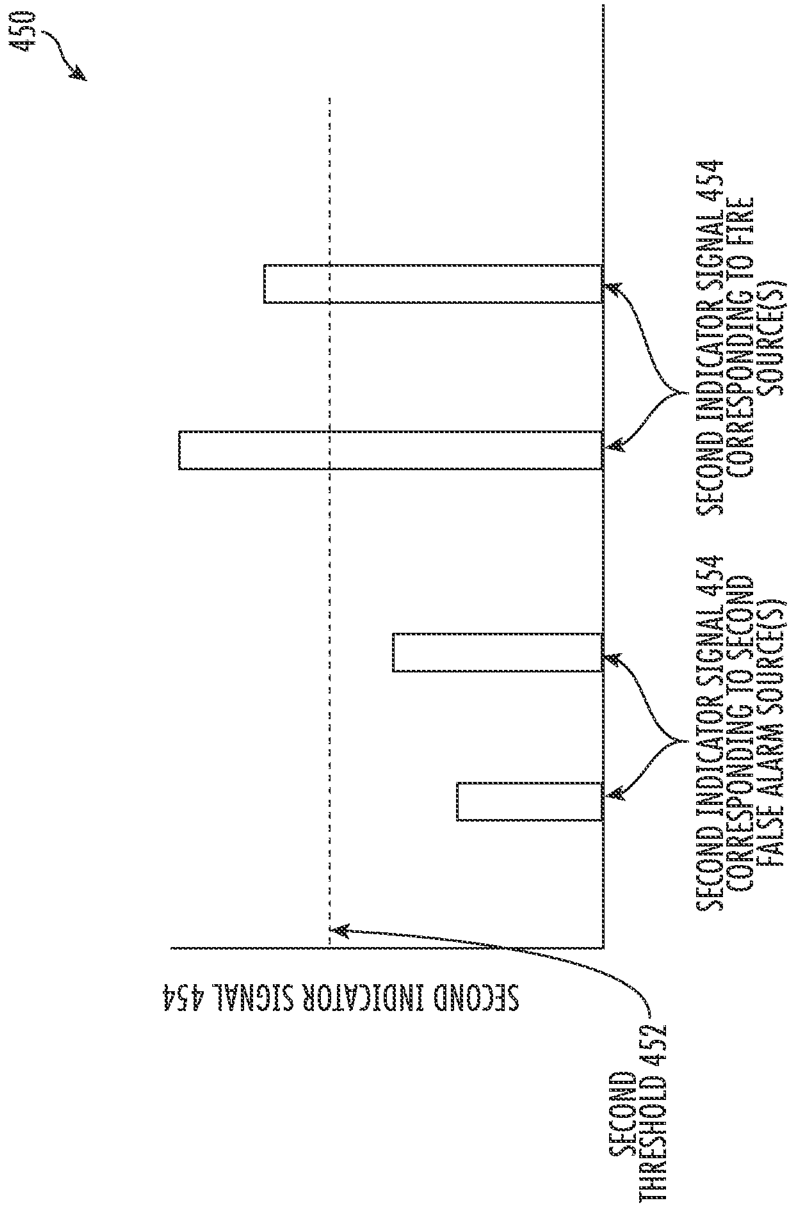
FIG. 4B illustrates an example diagram for determining a threshold in accordance with various embodiments of the present disclosure.

In various embodiment, as illustrated in FIG. 4B, a diagram 450 for determining a second threshold 452 is provided. In various embodiments, the controller 114 may determine the second indicator signal 454 for various false alarm source(s) including hot steam, and/or various fire source(s) generating the infrared radiation 112. According to various embodiments, the fire sources may include various fire producing fuels such as hydrogen, heptane, n-heptane, Jet Propellant 8 (JP8), methanol, ethanol, diesel, gasoline, isopropyl alcohol (IPA), etc. In various embodiments herein the second threshold 452 is selected so that it exceeds the second indicator signal 454 corresponding to any of the false alarm source(s) including hot steam, and falls below the second indicator signal 454 corresponding to any of the fire sources.

In various embodiments, the controller 114 may generate the fire alarm using the comparison of the first indicator signal 404 with the first threshold 402 and the comparison of the second indicator signal 454 with the second threshold 452. In various embodiments, the controller 114 may generate the fire alarm when the first indicator signal 404 is greater than the first threshold 402 and the second indicator signal 454 greater than the second threshold 402.

In various embodiments herein, the controller 114 may further distinguish false alarm source(s) including hot steam from various fire source(s) using visible range camera(s). In various embodiments, hot steam may be generated from known location(s) in the environment of the fire detection apparatus 100, for example the location of water pipes. Using the visible range camera(s), the controller 114 may mark the potential location(s) of the hot steam. In various embodiments, the controller 114 generates the fire alarm when the visible wavelength camera(s) do not detect steam in the known location(s), in addition to and/or any combination with other condition(s) in various embodiments herein for generating the fire alarm.

Figure 5:
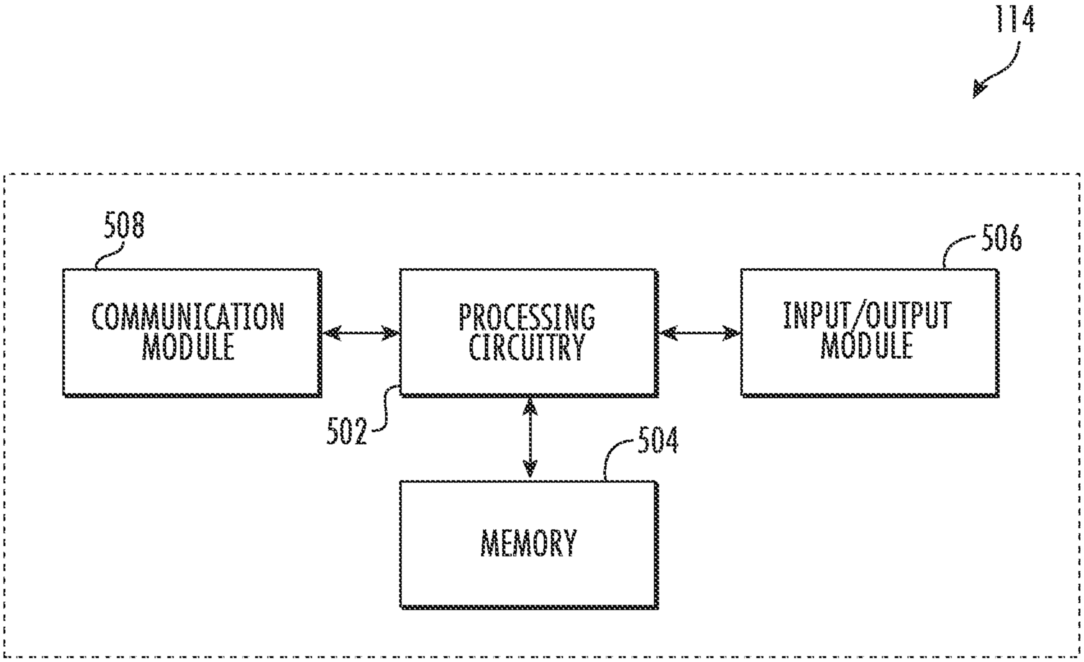
FIG. 5 illustrates an example schematic diagram depicting a controller in accordance with various embodiments of the present disclosure.

Referring now to FIG. 5, a schematic diagram depicting an example controller 500 of an example apparatus in electronic communication with various other components in accordance with various embodiments of the present disclosure is provided. As shown, the controller 114 comprises processing circuitry 502, a communication module 508, input/output module 506, a memory 504 and/or other components configured to perform various operations, procedures, functions or the like described herein.

In various embodiments, referring to FIG. 1, the controller 114 (such as the processing circuitry 502, communication module 508, input/output module 506 and memory 504) is electrically coupled to and/or in electronic communication with the first and second infrared cameras 102 and 104. In various embodiments, each of the first and second infrared cameras 102 and 104 may exchange (e.g., transmit and receive) data with the processing circuitry 502 of the controller 114.

The processing circuitry 502 may be implemented as, for example, various devices comprising one or a plurality of microprocessors with accompanying digital signal processors; one or a plurality of processors without accompanying digital signal processors; one or a plurality of coprocessors; one or a plurality of multi-core processors; one or a plurality of controllers; processing circuits; one or a plurality of computers; and various other processing elements (including integrated circuits, such as ASICs or FPGAs, or a certain combination thereof). In some embodiments, the processing circuitry 502 may comprise one or more processors. In one exemplary embodiment, the processing circuitry 502 is configured to execute instructions stored in the memory 504 or otherwise accessible by the processing circuitry 502. When executed by the processing circuitry 502, these instructions may enable the controller 114 to execute one or a plurality of the functions as described herein. No matter whether it is configured by hardware, firmware/software methods, or a combination thereof, the processing circuitry 502 may comprise entities capable of executing operations according to the embodiments of the present invention when correspondingly configured. Therefore, for example, when the processing circuitry 502 is implemented as an ASIC, an FPGA, or the like, the processing circuitry 502 may comprise specially configured hardware for implementing one or a plurality of operations described herein. Alternatively, as another example, when the processing circuitry 502 is implemented as an actuator of instructions (such as those that may be stored in the memory 504), the instructions may specifically configure the processing circuitry 502 to execute one or a plurality of algorithms and operations described herein, such as those discussed with reference to FIG. 6 and FIG. 7.

The memory 504 may comprise, for example, a volatile memory, a non-volatile memory, or a certain combination thereof. Although illustrated as a single memory in FIG. 5, the memory 504 may comprise a plurality of memory components. In various embodiments, the memory 504 may comprise, for example, a hard disk drive, a random access memory, a cache memory, a flash memory, a Compact Disc Read-Only Memory (CD-ROM), a Digital Versatile Disk Read-Only Memory (DVD-ROM), an optical disk, a circuit configured to store information, or a certain combination thereof. The memory 504 may be configured to store information, data, application programs, instructions, and etc., so that the controller 114 can execute various functions according to the embodiments of the present disclosure. For example, in at least some embodiments, the memory 504 is configured to cache input data for processing by the processing circuitry 502. Additionally or alternatively, in at least some embodiments, the memory 504 is configured to store program instructions for execution by the processing circuitry 502. The memory 504 may store information in the form of static and/or dynamic information. When the functions are executed, the stored information may be stored and/or used by the controller 114.

The communication module 508 may be implemented as any apparatus included in a circuit, hardware, a computer program product or a combination thereof, which is configured to receive and/or transmit data from/to another component or apparatus. The computer program product comprises computer-readable program instructions stored on a computer-readable medium (for example, the memory 504) and executed by a controller 114 (for example, the processing circuitry 502). In some embodiments, the communication module 508 (as with other components discussed herein) may be at least partially implemented as the processing circuitry 502 or otherwise controlled by the processing circuitry 502. In this regard, the communication module 508 may communicate with the processing circuitry 502, for example, through a bus. The communication module 508 may comprise, for example, antennas, transmitters, receivers, transceivers, network interface cards and/or supporting hardware and/or firmware/software, and is used for establishing communication with another apparatus. The communication module 508 may be configured to receive and/or transmit any data that may be stored by the memory 504 by using any protocol that can be used for communication between apparatuses. The communication module 508 may additionally or alternatively communicate with the memory 504, the input/output module 506 and/or any other component of the controller 114, for example, through a bus.

In some embodiments, the controller 114 may comprise an input/output module 506. The input/output module 506 may communicate with the processing circuitry 502 to receive instructions input by the user and/or to provide audible, visual, mechanical or other outputs to the user. Therefore, the input/output module 506 may be in electronic communication with supporting devices, such as a keyboard, a mouse, a display, a touch screen display, and/or other input/output mechanisms. Alternatively, at least some aspects of the input/output module 506 may be implemented on a device used by the user to communicate with the controller 114. The input/output module 506 may communicate with the memory 504, the communication module 508 and/or any other component, for example, through a bus. One or a plurality of input/output modules and/or other components may be included in the controller 114.

Figure 6:
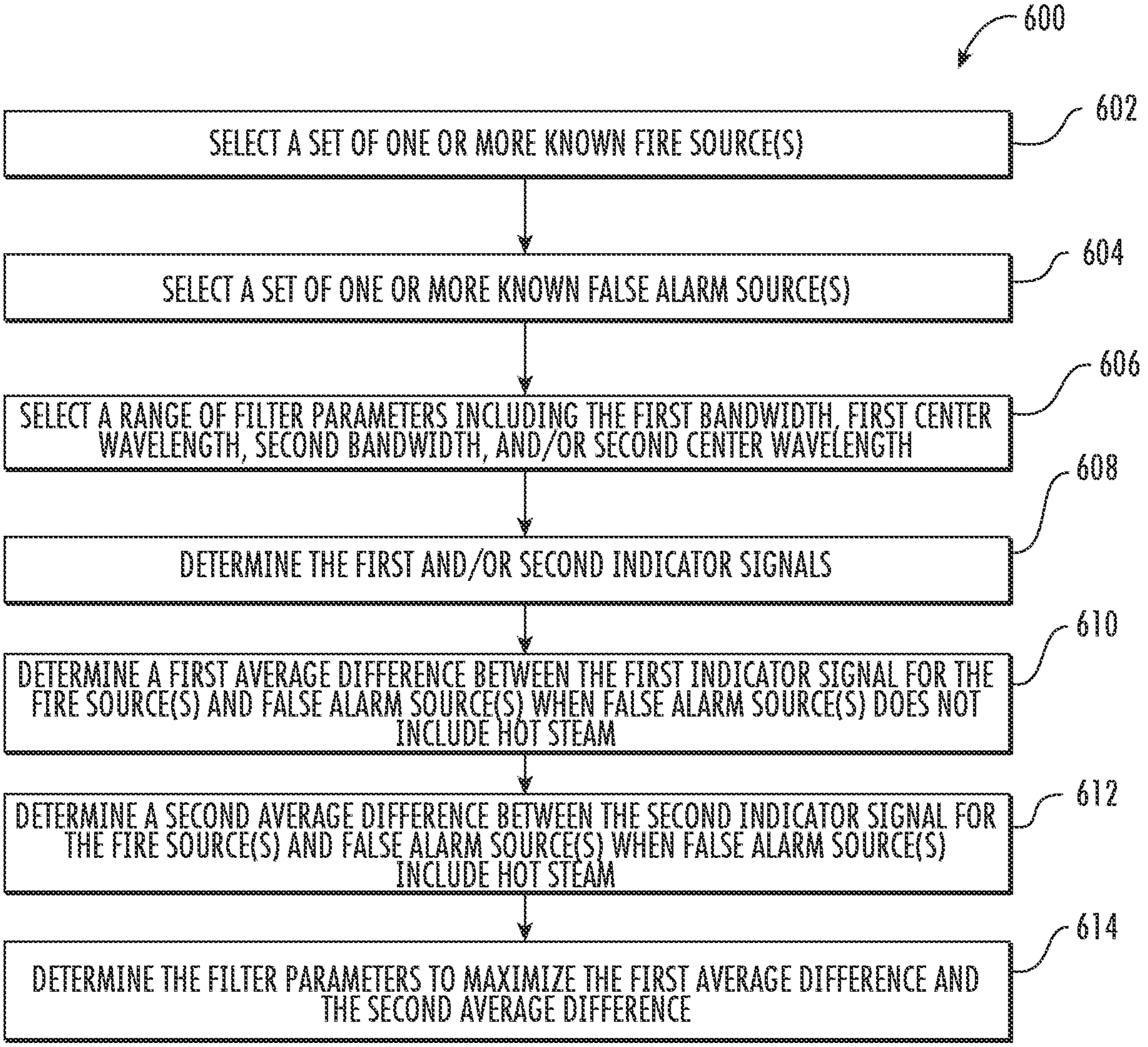
FIG. 6 is a flowchart diagram illustrating example operations in accordance with various embodiments of the present disclosure.
Figure 7:
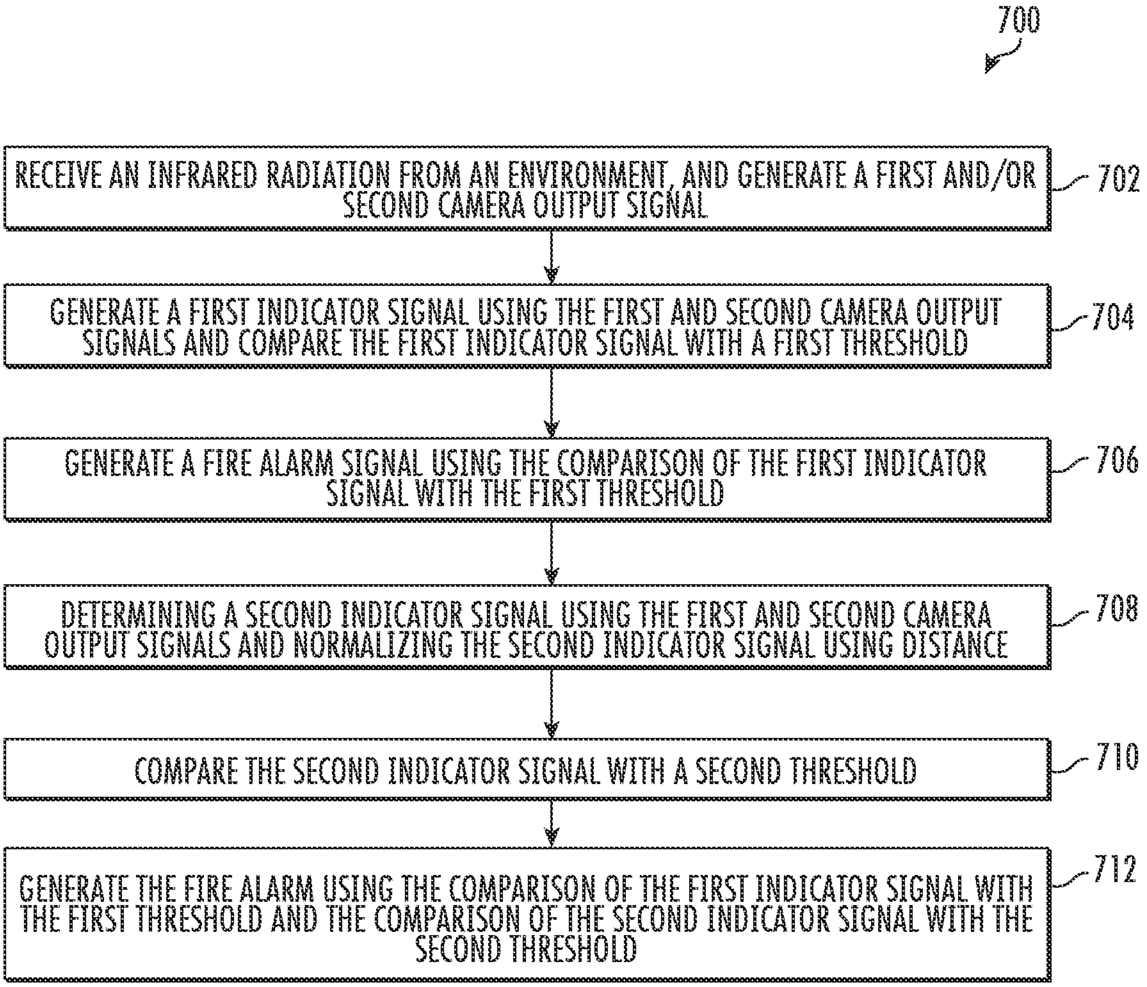
FIG. 7 is a flowchart diagram illustrating example operations in accordance with various embodiments of the present disclosure.

Referring now to FIG. 6 and FIG. 7, flowchart diagrams illustrating example operations 600 and 700, respectively, in accordance with various embodiments of the present disclosure are provided.

Referring now to FIG. 6, in some example, the method 600 may be performed by a fire detection apparatus. The fire detection apparatus may be similar to the fire detection apparatus 100 described above with regard to FIG. 1. As noted above with respect to FIG. 1, the fire detection apparatus may include controller 114 described above in regard to FIG. 5 and may similarly comprise processing circuitry 502, a communication module 508, an input/output module 506 and a memory 504. As noted above with regard to FIG. 1, the fire detection apparatus may include infrared cameras 102 and 104. In some examples, the memory of the controller of the fire detection apparatus may store computer program instructions.

In some examples, one or more of the procedures described in FIG. 6 may be embodied by computer program instructions, which may be stored by a memory (such as a non-transitory memory) of a system employing an embodiment of the present disclosure and executed by a processing circuitry (such as a processor) of the system. These computer program instructions may direct the system to function in a particular manner, such that the instructions stored in the memory circuitry produce an article of manufacture, the execution of which implements the function specified in the flow diagram step/operation(s). Further, the system may comprise one or more other circuitries. Various circuitries of the system may be electronically coupled between and/or among each other to transmit and/or receive energy, data and/or information.

In some examples, embodiments may take the form of a computer program product on a non-transitory computer-readable storage medium storing computer-readable program instruction (e.g., computer software). Any suitable computer-readable storage medium may be utilized, including non-transitory hard disks, CD-ROMs, flash memory, optical storage devices, or magnetic storage devices.

In various embodiments, at step 602, a controller (such as, but not limited to, the controller 114 of the fire detection apparatus 100 illustrated above referring to FIG. 1) may select a set of one or more known fire source(s). For example, any of known fire sources including but not limited to hydrogen, heptane, n-heptane, Jet Propellant 8 (JP8), methanol, ethanol, diesel, gasoline, isopropyl alcohol (IPA), etc. may be selected. In various embodiments, at step 604, a controller (such as, but not limited to, the controller of the fire detection apparatus 100 illustrated above referring to FIG. 1) may select a set of one or more known false alarm source(s). In various embodiments, any of known false alarm sources including but not limited to arc welding, heater for example IR heater, high temperature carbon dioxide gas, and/or IR reflecting material(s) and/or surface(s), hot steam, etc. may be selected.

In various embodiments, at step 606, the controller 114 selects a range of filter parameters for the first and second filters 106 and 108, for example for the first and second bandpass filters (referring to FIG. 1). In various embodiments, the filter parameters may include the first bandwidth 204, first center wavelength 202, second bandwidth 212, and/or second center wavelength 210. In various embodiments, for example a range of about 7 to about 8 microns may be selected for the first center wavelength 202. In various embodiments, for example a range of about 8 to about 14 microns may be selected for the second center wavelength 210. In various embodiments, for example a range of about 0 to about 1 micron may be used for the first bandwidth 204. In various embodiments, for example a range of about 0 to about 6 microns may be used for the second bandwidth 212. In various embodiments, the selected range for the first and the second bandwidths 204 and 212 may be subject to the condition that the first and the second bandwidths 204 and 212 do not overlap.

In various embodiments, at step 608, the controller 114 determines the first and/or second indicator signal corresponding to both the selected set of one or more known fire source(s) and for the selected set of one or more known false alarm source(s). In various embodiments, when the selected false alarm source at step 604 does not include hot steam, the first indicator signal is calculated. In various embodiments, when the selected false alarm source at step 604 includes hot steam, the second indicator signal is calculated.

In various embodiments, at step 610, the controller 114 determines a first average difference between the first indicator signal corresponding to the fire source(s) and false alarm source(s) when false alarm source(s) does not include hot steam. In various embodiments, the controller 114 may use a weighted averaging technique to determine the first average difference.

In various embodiments, at step 612, the controller 114 determines a second average difference between the second indicator signal corresponding to the fire source(s) and false alarm source(s) when false alarm source(s) includes hot steam. In various embodiments, the controller 114 may use a weighted averaging technique to determine the second average difference.

In various embodiments, at step 614, the controller 114 determines the filter parameters to maximize the first average difference when the when false alarm source(s) does not include hot steam and to maximize the second average difference when false alarm source(s) includes hot steam. In various embodiments, controller 114 determine the filter parameters by iteratively selecting values for the filter parameters. Controller 114 may calculate the first average difference and/or the second average difference as described above for each selected value for the filter parameters in the iteration. The controller 114, after the iteration through multiple values for the filter parameters, may determine the filter parameters that maximize the first average difference and/or the second average difference as described above.

Referring now to FIG. 7, in some example, the method 700 may be performed by a fire detection apparatus. The fire detection apparatus may be similar to the fire detection apparatus 100 described above with regard to FIG. 1. As noted above with respect to FIG. 1, the fire detection apparatus may include controller 114 described above in regard to FIG. 5 and may similarly comprise processing circuitry 502, a communication module 508, an input/output module 506 and a memory 504. As noted above with regard to FIG. 1, the fire detection apparatus may include infrared cameras 102 and 104. In some examples, the memory of the controller of the fire detection apparatus may store computer program instructions.

In some examples, one or more of the procedures described in FIG. 7 may be embodied by computer program instructions, which may be stored by a memory (such as a non-transitory memory) of a system employing an embodiment of the present disclosure and executed by a processing circuitry (such as a processor) of the system. These computer program instructions may direct the system to function in a particular manner, such that the instructions stored in the memory circuitry produce an article of manufacture, the execution of which implements the function specified in the flow diagram step/operation(s). Further, the system may comprise one or more other circuitries. Various circuitries of the system may be electronically coupled between and/or among each other to transmit and/or receive energy, data and/or information.

In some examples, embodiments may take the form of a computer program product on a non-transitory computer-readable storage medium storing computer-readable program instruction (e.g., computer software). Any suitable computer-readable storage medium may be utilized, including non-transitory hard disks, CD-ROMs, flash memory, optical storage devices, or magnetic storage devices.

In various embodiments, at step 702, a fire detection apparatus (such as, but not limited to, the fire detection apparatus 100 illustrated above referring to FIG. 1) may receive an infrared radiation from an environment. The fire detection apparatus may generate a first camera output signal using a first infrared camera (for example infrared camera 102) and generate a second camera output signal using a second infrared camera (for example infrared camera 104).

In various embodiments, at step 704, the fire detection apparatus using a controller (for example controller 114) may generate a first indicator signal using the first and second camera output signals, and compare the first indicator signal with a first threshold.

In various embodiments, at step 706, the fire detection apparatus using a controller (for example controller 114) may generate a fire alarm signal using the comparison of the first indicator signal with the first threshold.

In various embodiments herein, the first camera output signal corresponds to the first bandwidth. For example, the first infrared camera that may generate the first camera output signal (for example first infrared camera 102) may include a first bandpass filter (for example first bandpass filter used for the first filter 106) having a first center wavelength (for example, referring to FIG. 2, first center wavelength 202) and a first bandwidth (for example first bandwidth 202).

In various embodiments herein, the second camera output signal corresponds to the second bandwidth. For example, the second infrared camera that may generate the second camera output signal (for example, referring to FIG. 1, second infrared camera 104) comprises a second bandpass filter (for example second bandpass filer used for the second filter 108) having a second center wavelength (for example, with reference to FIG. 2, the second center wavelength 210) and a second bandwidth (for example the second bandwidth 212).

In various embodiment, the first center wavelength is between about 7 microns and about 8 microns and the second center wavelength is between about 8 microns and about 14 microns. In various embodiments, the first bandwidth and the second bandwidth do not overlap. In various embodiments, the first camera output signal is a first infrared radiation intensity detected by the first camera in the first bandwidth, and the second camera output signal is a second infrared radiation intensity detected by the second camera in the second bandwidth.

In various embodiments, the fire detection apparatus using a controller determines a difference between the first camera output signal and the second camera output signal, normalize the difference with a sum of the first camera output signal and the second camera output signal, and generates the first indicator signal using the normalized difference between the first and second camera output signals, for example as described by Eq. 1.

In various embodiments, the fire detection apparatus using a controller may determine the first threshold to distinguish between when the infrared radiation is generated by water byproduct of fire versus when the infrared radiation is generated by a first category of one or more false alarm sources comprising any of arc welding, a heater, and high temperature carbon dioxide gas, as for example illustrated in FIG. 4A.

In various embodiments, the fire detection apparatus using a controller determines a distance of an infrared radiation source, for example infrared radiation source 110 with reference to FIG. 1, from the fire detection apparatus. In example embodiments, the controller may determine the distance of the infrared radiation source from the fire detection apparatus using a phase difference of the infrared radiation when received by the first infrared camera that may generate the first camera output signal compared to when received by the second infrared camera that may generate the second camera output signal. In example embodiments the controller may determine the distance using triangulation. In example embodiments the controller may determine the distance using a Time of Flight (ToF) distance measuring device. In example embodiments the controller may use a separation between the first infrared camera 102 and the second infrared camera 104 to identify parallax versus distance for the infrared radiation source 110 and to determine distance.

In various embodiments, at step 708, the fire detection apparatus using a controller (for example controller 114) may determine a second indicator signal using a sum of the first and second camera output signals and normalize the second indicator signal using the distance.

In various embodiments, at step 710, the fire detection apparatus using a controller (for example controller 114) may compare the second indicator signal with a second threshold.

In various embodiments, at step 710, the fire detection apparatus using a controller (for example controller 114) may generate the fire alarm using the comparison of the first indicator signal with the first threshold and the comparison of the second indicator signal with the second threshold.

In various embodiments, the fire detection apparatus using a controller may determine the second threshold to distinguish between when the infrared radiation is generated by water byproduct of fire versus when the infrared radiation is generated by a second category of one or more false alarm sources comprising hot steam, as for example illustrated in FIG. 4B.

Many modifications and other embodiments of the present disclosure set forth herein will come to mind to one skilled in the art to which these embodiments pertain having the benefit of the teachings presented in the foregoing descriptions and the associated drawings. Therefore, it is to be understood that the disclosure are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A fire detection apparatus comprising: a first infrared camera comprising a first filter; a second infrared camera comprising a second filter; a controller electronically coupled to the first and second infrared cameras, the controller having processing circuitry and a memory, the controller configured to: generate a first indicator signal based on a difference between using a first camera output signal corresponding to a first bandwidth, and a second camera output signal corresponding to a second bandwidth, wherein the first camera output signal corresponds to a first bandwidth of the first filter, and wherein the second camera output signal corresponds to a second bandwidth of the second filter; determine a distance of an infrared radiation source from the fire detection apparatus based on the first camera output signal and the second camera output signal; determine a second indicator signal based on a sum of the first camera output signal and the second camera output signals; normalize the second indicator signal based on the determined distance; compare the first indicator signal with a first threshold and compare and the second indicator signal with a first threshold and a second threshold, respectively wherein the first threshold is used to distinguish between when the infrared radiation is generated by water byproduct of fire versus when the infrared radiation is generated by a first category of one or more false alarm sources and the second threshold is used to distinguish between when the infrared radiation is generated by water byproduct of fire versus or when the infrared radiation is generated by a second category of one or more false alarm sources; and generate a fire alarm signal based on using the comparison of the first indicator signal with the first threshold and the comparison of the second indicator signal with the second threshold.

2. The fire detection apparatus according to claim 1, wherein:

the first infrared camera is configured to:

receive an infrared radiation from an environment; and generate the first camera output signal in response to receiving the infrared radiation;

the second infrared camera configured to:

receive the infrared radiation from the environment; and generate the second camera output signal in response to receiving the infrared radiation.

3. The fire detection apparatus according to claim 1, wherein:

the first filter comprises a first bandpass filter having a first center wavelength and the first bandwidth; and the second filter comprises a second bandpass filter having a second center wavelength and the second bandwidth.

4. The fire detection apparatus according to claim 3, wherein the first center wavelength is between about 7 microns and about 8 microns and the second center wavelength is between about 8 microns and about 14 microns.

5. The fire detection apparatus according to claim 3, wherein the first bandwidth and the second bandwidth do not overlap.

6. The fire detection apparatus according to claim 3, wherein the first camera output signal is a first infrared radiation intensity detected by the first camera in the first bandwidth, and the second camera output signal is a second infrared radiation intensity detected by the second camera in the second bandwidth.

7. The fire detection apparatus according to claim 3, wherein the controller is further configured to:

determine a difference between the first camera output signal and the second camera output signal;

normalize the difference with a sum of the first camera output signal and the second camera output signal; and generate the first indicator signal using the normalized difference between the first and second camera output signals.

8. The fire detection apparatus according to claim 1, wherein the first threshold is determined to distinguish between when the infrared radiation is generated by water byproduct of fire versus when the infrared radiation is generated by a first category of one or more false alarm sources comprising any of arc welding, a heater, high temperature carbon dioxide gas, and/or IR reflecting material(s) and/or surface(s).

9. The fire detection apparatus according to claim 1, wherein the second threshold is determined to distinguish between when the infrared radiation is generated by water byproduct of fire versus when the infrared radiation is generated by a second category of one or more false alarm sources comprising hot steam.

10. A method for fire detection, the method comprising: determining a first wavelength response wherein the first wavelength response corresponds to a first bandwidth of a first filter; determining a second wavelength response wherein the second wavelength response corresponds to a second bandwidth of a second filter; generating a first indicator signal using based on a difference between a first camera output signal corresponding to the first bandwidth and a second camera output signal corresponding to the second bandwidth; determining a distance of an infrared radiation source from the fire detection apparatus based on the first camera output signal and the second camera output signal; determining a second indicator signal based on a sum of the first camera output signal and the second camera output signals; normalizing the second indicator signal based on the determined distance; comparing the first indicator signal and the second indicator signal with a first threshold and a second threshold, respectively wherein the first threshold is used to distinguish between when the infrared radiation is generated by water byproduct of fire versus or when the infrared radiation is generated by a first category of one or more false alarm sources and the second threshold is used to distinguish between when the infrared radiation is generated by water byproduct of fire versus when the infrared radiation is generated by a second category of one or more false alarm sources; and generating a fire alarm signal using based on the comparison of the first indicator signal with the first threshold.

11. The method for fire detection according to claim 10, the method comprising:
- receiving an infrared radiation from an environment;
- generating the first camera output signal in response to receiving the infrared radiation; and
- generating the second camera output signal in response to receiving the infrared radiation.

12. The method for fire detection according to claim 10, wherein:
- the first wavelength response comprises a first center wavelength and the first bandwidth; and
- the second wavelength response comprises a second center wavelength and the second bandwidth.

13. The method for fire detection according to claim 12, wherein the first center wavelength is between about 7 microns and about 8 microns and the second center wavelength is between about 8 microns and about 14 microns.

14. The method for fire detection according to claim 12, wherein the first bandwidth and the second bandwidth do not overlap.

15. The method for fire detection according to claim 12, wherein the first camera output signal is a first infrared radiation intensity detected by a first camera in the first bandwidth, and the second camera output signal is a second infrared radiation intensity detected by a second camera in the second bandwidth.

16. The method for fire detection according to claim 10, the method further comprising:
- determining a difference between the first camera output signal and the second camera output signal;
- normalizing the difference with a sum of the first camera output signal and the second camera output signal; and
- generating the first indicator signal using the normalized difference between the first and second camera output signals.

17. The method for fire detection according to claim 10, the method further comprising determining the first threshold to distinguish between when the infrared radiation is generated by water byproduct of fire versus when the infrared radiation is generated by a first category of one or more false alarm sources comprising any of arc welding, a heater, high temperature carbon dioxide gas, and/or IR reflecting material(s) and/or surface(s).

18. The method for fire detection according to claim 17, the method further comprising determining the second threshold to distinguish between when the infrared radiation is generated by water byproduct of fire versus when the infrared radiation is generated by a second category of one or more false alarm sources comprising hot steam.

* * * * *